April 20, 1965

P. W. FITT ETAL 3,179,119

BREATHING APPARATUS

Filed June 5, 1961

INVENTORS
PETER WILLIAM FITT
KENNETH HUGH FOULKES

BY *Larson and Taylor*

ATTORNEYS

INVENTORS
PETER WILLIAM FITT
KENNETH HUGH FOULKES

BY Larson and Taylor

ATTORNEYS

April 20, 1965   P. W. FITT ETAL   3,179,119
BREATHING APPARATUS

Filed June 5, 1961   4 Sheets-Sheet 4

INVENTORS
PETER WILLIAM FITT
KENNETH HUGH FOULKES

BY *Larson and Taylor*

ATTORNEYS

United States Patent Office 3,179,119
Patented Apr. 20, 1965

3,179,119
BREATHING APPARATUS
Peter W. Fitt and Kenneth H. Foulkes, Yeovil, England,
assignors to Normalair Limited, Yeovil, England
Filed June 5, 1961, Ser. No. 114,972
Claims priority, application Great Britain, June 11, 1960,
20,622/60
6 Claims. (Cl. 137—64)

This invention relates to demand regulators of the type used by crew members of aircraft flying at considerable altitudes and more particularly to a breathing system employing such demand regulators.

To enable demand regulators to be made sufficiently small to be mounted on ejection seats it is convenient to use servo regulators such as that described in British patent specification 785,371.

One of the objects of a seat-mounted regulator is to replace existing panel-mounted regulators which are an embarrassment from the installation point of view. Generally, panel-mounted regulators provide a number of manual over-ride controls and visual indicators which have to be positioned at a suitable point on the instrument panel. Generally, also, these controls and indicators must be within reach and sight of the user. Because the regulator panel is directly associated with the body of regulator, its size is dictated more by structural mounting requirements than by clear presentation of controls and indicators. The advantage of a seat mounted regulator is that it can be positioned out of the user's sight and operated by remote conrtol. This can also, of course, be achieved with an aircraft-mounted regulator, but a further advantage is lost in such a case, this advantage being the need of only one main oxygen regulator for normal flight use and post-ejection use.

A further advanatge of seat-mounted regulators is that they are located nearer to the user and provide greater scope for decreasing the resistance to breathing offered by the length of tube between the user and the regulator.

The present invention concerns oxygen servo pressure operated demand regulators which automatically control the proportion of air which is mixed with the oxygen until a chosen altitude is attained after which 100% oxygen is supplied.

The invention also concerns servo pressure operated demand regulators which above a chosen altitude provide a safety pressure (in excess of cabin pressure) to ensure that air does not leak inwardly past the face mask of the user and dilute or contaminate the oxygen being breathed.

The object of the present invention is to provide a system employing a small light oxygen demand regulator, said system being suitable for installation on an aircraft ejection seat, said regulator being particularly characterised by automatic means for controlling the proportion of air which is mixed with the oxygen (hereinafter termed "airmix"), means for automatically applying safety pressure, low resistance to breathing, means for indicating that the regulator is operating and control means suitable for remote operation.

It is a further object of the invention to provide a system according to the preceding paragraph where said demand regulator comprises a servo operated demand regulator characterised by means providing airmix during a predetermined first altitude range, means providing rapid application of safety pressure upon a predetermined altitude, being attained, means providing oxygen without dilution within a second predetermined altitude range, and means providing oxygen at a predetermined constant absolute pressure at altitudes above said second altitude range.

The invention consists in an aircraft breathing system comprising in combination a first oxygen supply source in combination by way of by-pass valve means with a main demand regulator, a second oxygen supply source in communication with said main demand regulator by way of said by-pass valve means, a secondary demand regulator in communication with either of said oxygen sources upon operation of said by-pass valve means.

Further objects and advantages of the invention will become apparent from the following detailed description with reference to the accompanying drawings.

Referring to the drawings.

Figure 1:
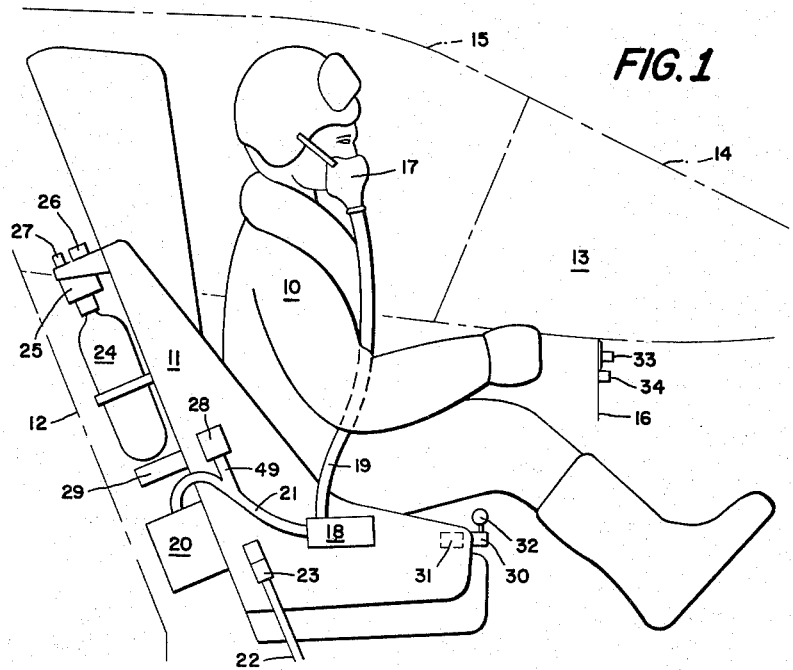
FIGURE 1 is a diagrammatic installation of the system mounted on an ejector seat in an aircraft.

In carrying the invention into effect according to one convenient form by way of example only, referring to FIGURE 1, a pilot 10 sits in an ejection seat 11, constrained to move in a direction parallel to the cabin rear bulkhead 12 when ejection takes plate. The cabin shown generally at 13 has a clear vision panel 14 and a canopy 15, and an instrument panel is indicated at 16. The pilot 10 wears a breathing mask 17 which is connected to the personal equipment connector 18 by way of the breathing tube 19. The main demand regulator 20 is mounted on the rear of the ejection seat 11 at the right hand side of the pilot and a pipe 21 connects the outlet of the main demand regulator 20 with the personal equipment connector 18.

High pressure breathable gas from a liquid oxygen converter mounted in the aircraft (not shown) is supplied to the equipment on the ejection seat 11, by way of pipe 22 and a pull-away coupling 23.

An emergency oxygen supply is provided upon the seat 11 by an oxygen cylinder 24 having a gas release mechanism 25, and a pressure reducer, pressure gauge 26 being provided to indicate the contents of the cylinder 24. The position of the gauge 26 is such that it may be read from outside the cabin and adjacent thereto is provided a pressure filling connection 27 for charging the cylinder 24 with oxygen gas.

In addition to the main demand regulator 20 a secondary demand regulator 28 is provided having its outlet connected to pipe 21. A by-pass valve 29 is mounted at the rear of the seat to allow gas to flow to either main demand regulator 20 or secondary demand regulator 28. The operation of the valve 29 is governed by a by-pass control 30 mounted at the left hand side of the front face of the seat 11.

A pressure test button unit 31 is provided upon the left hand side in a forward position on the seat 11 and operated in a manner as to be hereinafter described.

At the front of the seat 11 in a position of the easy access to the pilot's right hand a knob 32 is disposed which is manually actuated to control the oxygen supply as hereinafter to be described, when a particular emergency arises.

A flow indicator 33 and an airmix over-ride switch 34 are mounted upon the instrument panel 16.

Figure 2:
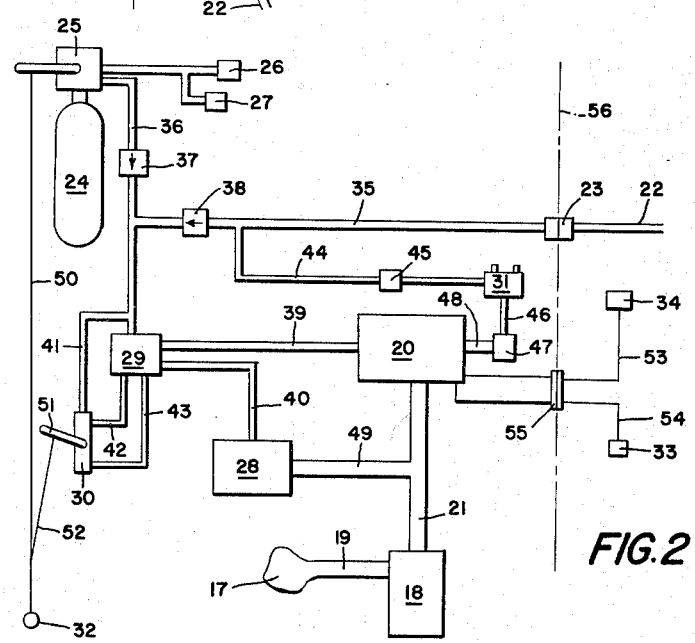
FIGURE 2 is a schematic drawing of the system.

For the sake of clarity, no small or medium size pipes, electric cables or flexible cables have been shown in FIGURE 1, but FIGURE 2 which shows a schematic drawing of the system will make readily apparent the relationship between the various integers.

Referring now to FIGURE 2 oxygen gas from the aircraft's supply pipe 22 passes through the pull-away coupling 23, and flows to bypass valve 29 by way of pipe 35. A pipe 36 connects the gas release mechanism 25 to the pipe 35 and a non-return valve 37 is provided in pipe 36. A further non-return valve 38 is provided in pipe 35 between the coupling 23 and the junction of pipe 36 and pipe 35. The pressure filling connection 27 and the pressure gauge 26 are connected to gas release mechanism 25. From the by-pass valve 29, a pipe 39 is adapted to supply oxygen to the main demand regulator 20; another pipe 40 connects the secondary demand regulator 28 to the by-pass valve 29.

A pipe 41 is connected to pipe 35 downstream of non-return valve 38 and is connected to by-pass control 30 and from the by-pass control 30 to pipes 42 and 43 are connected to the by-pass valve 29. From the pipe 35 at a point between the pull-away coupling 23 and non-return valve 38, a pipe 44 provides communication to the pressure test button unit 31, a restriction orifice 45 being provided within the pipe 44. A pipe 46 from the unit 31 passes to a relay valve 47 mounted adjacent to the main demand regulator 20, the relay valve 47 being connected to the main demand regulator 20 by way of pipe 48. A pipe 49 provides communication between the secondary demand regulator 28 and the pipe 21 connecting the main demand regulator 20 to the personal equipment connector 18.

The pipes 41, 42, 43, 44 and 46 are of small bore for example 1/16", the pipes 22, 35, 36, 39 and 40 are of medium size bore for example 1/4" and the pipes 21, 48 and 49 are of large bore for example 1/2".

The knob 32 is connected to the gas release mechanism 25 by way of a flexible cable 50, the knob 32 also being connected to a lever 51 on the by-pass control 30 by way of flexible cable 52. The airmix over-ride switch 34 is connected to the main demand regulator 20 by electric cables 53 and the flow indicator 33 is connected to the main demand regulator 20 by electric cables 54. For clarity cables 53 and 54 are represented in FIGURE 2 by single lines. The cables 53 and 54 are provided with a break-away coupling 55, which may conveniently be incorporated in an existing coupling having provision for microphone and earphone leads. A separation line 56 has been shown passing through pull-away coupling 23 and break away coupling 55 and all items shown to the left hand side of the line 56 remain with the ejection seat upon ejection, the items to the right hand side of line 56 remaining with the aircraft.

Figure 3:
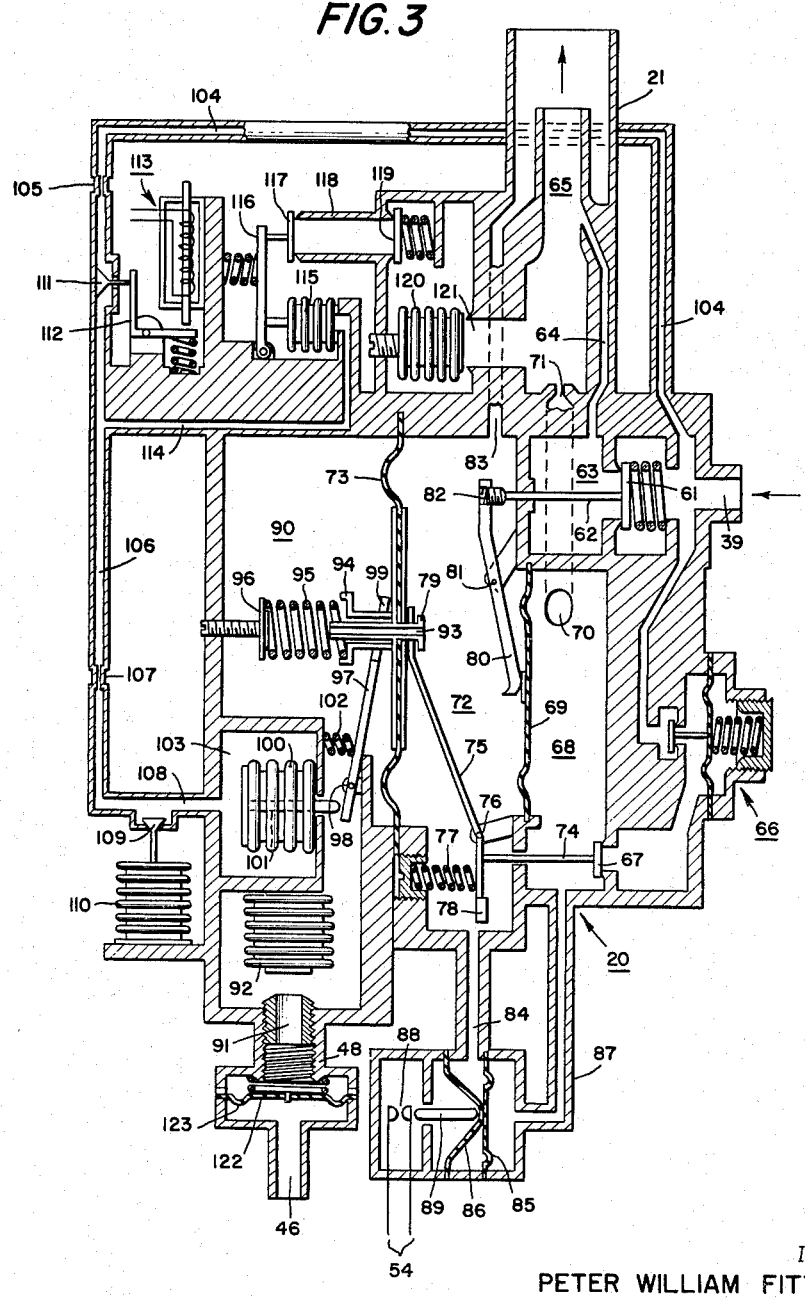
FIGURE 3 is a schematic drawing of the main demand regulator.

Referring to FIGURE 3 the main demand regulator generally indicated at 20 is as described in British patent specification No. 785,371 but it has a number of additional improvements and refinements.

Oxygen is supplied under pressure to the main demand regulator 20 by way of pipe 39 and passes to an inlet chamber containing the demand valve 61 which is adapted to be spring urged against a seating formed on the wall of the chamber. A valve stem 62 attached to valve 61 passes through the valve seating and into a second chamber 63 and then through a wall thereof in a substantially gas tight manner. The chamber 63 has an outlet bore 64 which communicates with a mixing tube 65, the bore 64 joining the tube 65 at an acute angle to assist flow therein. From the inlet chamber, gas is supplied to a reducing valve 66 which supplies gas at a reduced pressure to servo valve 67. The servo valve 67 is housed in a servo chamber 68, one wall of which is partially formed by a secondary diaphragm 69, the servo chamber 68 communicating by means of a passage 70 with a nozzle 71 which with mixing tube 65 forms an airmix injector.

Upon the opposite side of secondary diaphragm 69 to the servo chamber 68 is provided a main chamber 72 having a part of one of its walls formed by a main diaphragm 73. The servo valve 67 is provided with a stem 74 which passes through the wall of servo chamber 68 into main chamber 72 in a substantially gas tight manner to contact a servo valve lever 75 adapted to pivot about pivot point 76.

A compression spring 77 acts upon the lever 75 on the side remote from stem 74, the end of the lever 75 adjacent to the stem 74 being provided with a balance weight 78; the other end of lever 75 is forked to engage with a circular grooved member 79 attached to the main diaphragm 73.

The secondary diaphragm 69 acts upon a demand valve lever 80 mounted in the main chamber 72. The lever 80 has a pivot 81 at substantially the mid point thereof and at the end remote from diaphragm 69 carries an adjusting screw 82 which contacts the end of valve stem 62. The main chamber 72 is provided with a feed back conduit 83 which joins the pipe 21 at a point where the pipe 21 surrounds the mixing tube 65. A pipe 84 connects the main chamber 72 to a point between a differential diaphragm 85 and a seal diaphragm 86, the other side of the differential diaphragm 85 being connected to the servo chamber 68 by way of pipe 87 and any movement of the diaphragms 85 and 86 is transmitted to a microswitch 88 by way of push rod 89.

The side of the main diaphragm 73 remote from main chamber 72 forms part of a wall of a control chamber 90. This control chamber 90 is in communication with cabin air by way of an aperture 91 which is controlled by an aneroid bellows 92. Communication is provided between the main chamber 72 and the control chamber 90 by way of a restriction means comprising a small hole 93 which passes through circular grooved member 79. A portion of the member 79 protrudes into chamber 90 to form a tubular guide for a cup member 94 which is provided with a hollow body passing over the tubular guide and resting against the main diaphragm 73. The cup member 94 carries one end of a safety pressure spring 95, the other end of spring 95 being carried by a pad 96 mounted from a wall of the control chamber 90 in a manner as to provide adjustment of the force in spring 95. A lever 97, provided with a pivot 98 mounted on a wall of control chamber 90, is provided with a forked end 99 adapted to lift the cup member 94 away from the diaphragm 73 when a bellows 100 housed in a chamber 103 is compressed, a rod 101 being adapted to urge the left hand end of lever 97 away from said bellows 100. A spring 102 holds the lever 97 out of contact with either the diaphragm 73 or the cup member 94 when the bellows 100 are expanded. Pressure is supplied from the inlet chamber by way of a pipe 104 to a first restriction 105, and a pipe 106 transmits pressure therefrom to a second restriction 107. A further pipe 108 is provided between the chamber 103 and second restriction 107, having a safety pressure bleed valve 109 provided therein and operated by a safety pressure control aneroid 110. The pipe 106 is provided with a bleed valve 111 actuated by a spring urged bell crank 112 tending to open the valve 111. A solenoid 113 is provided to overcome the spring loading of the bell crank when the solenoid is energized thus allowing the valve 111 to close.

Communication is provided between pipe 106 and interior of pressure bellows 115 by way of pipe 114. Bellows 115 contact a beam 116 carrying an air valve 117, the beam 116 being spring loaded to allow the valve 117 to close if there is no pressure in the bellows 115.

A tube 118 forming a seating for valve 117 at one end thereof, is provided with a spring loaded check valve 119 at the other end thereof. An airmix aneroid 120 is provided to control an opening 121 which leads to the airmix injector formed by nozzle 71 and mixing tube 65.

Outlet from control chamber 90 is provided by way of aperture 91 and pipe 48 to relay valve 47, which comprises a valve plate 122 having a small orifice in the centre thereof. The valve plate 122 is spring urged away from a seating formed by the end of pipe 4 in a manner that there is normally free communication between cabin air and the pipe 48 by way of holes provided in the casing of relay valve 47. The valve plate 122 is carried by a diaphragm 123 in a manner such that if pressure is built up in pipe 46 diaphragm 123 will move and valve plate 122 will seat on the end of pipe 48.

Figure 4:
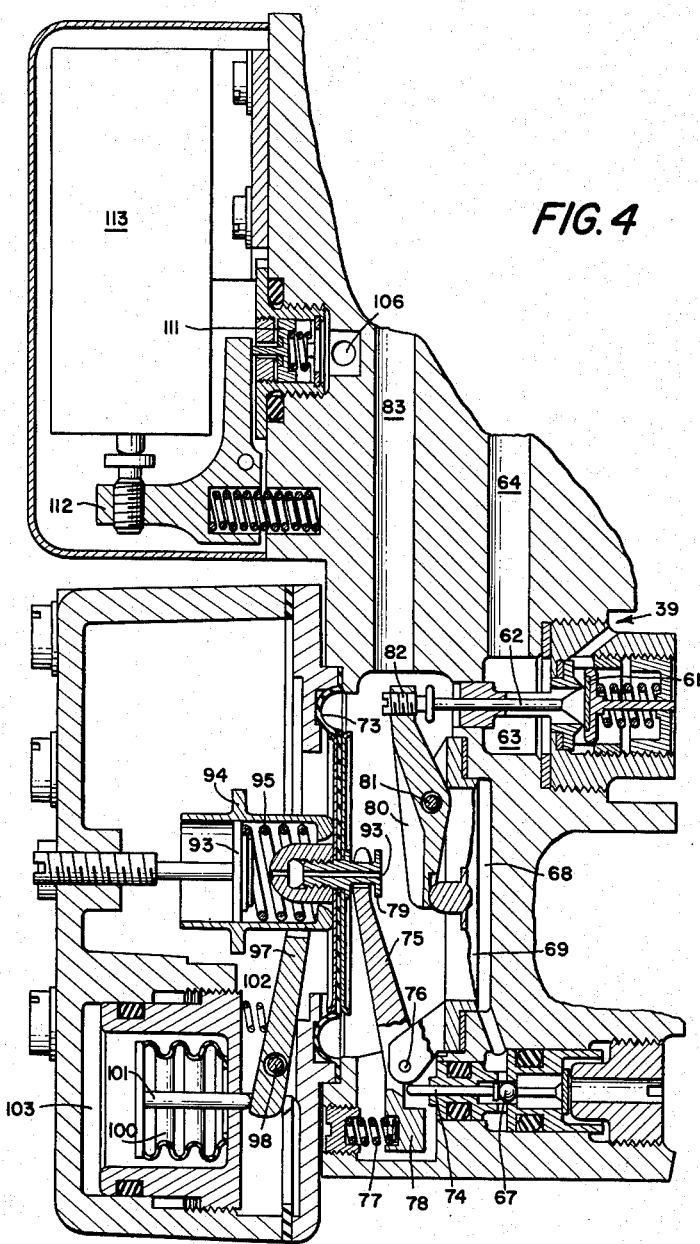
FIGURE 4 is a sectional side elevation of a portion of the main demand regulator.
Figure 5:
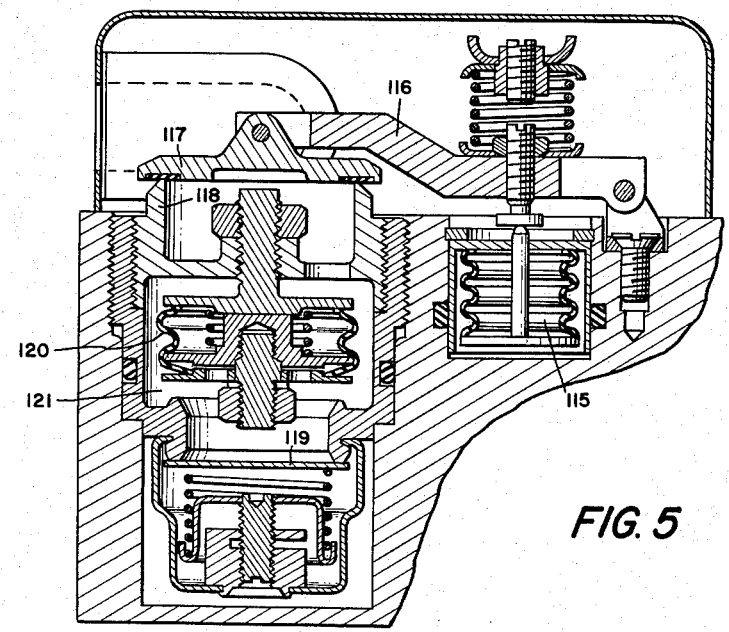
FIGURE 5 is a section showing the airmix aneroid and the controlled air entry mechanism.
Figure 6:
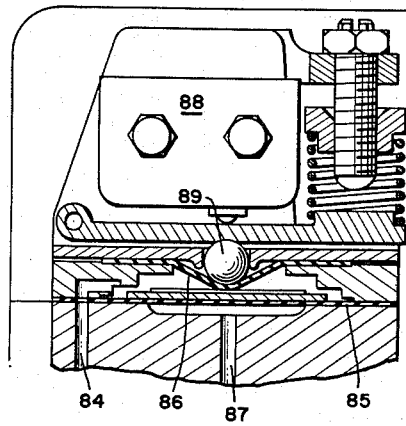
FIGURE 6 is a section of the mechanism indicating that the main demand regulator is operating.

Referring to FIGURES 4, 5 and 6 which show engineering details of the regulator, the reference numerals correspond with numerals designated to corresponding items in FIGURES 1, 2 and 3.

The operation of the system will now be briefly described, the main demand regulator 20 is designed to provide all the functions of existing panel-mounted regulators with improvements in performance as far as the user is concerned. Its design is based on the regulator as shown in British patent specification 785,371, which was especially designed to be a servo-operated unit. This principle of operation is selected for reasons of miniaturisation, and the need for certain automatic and manual controls.

Basically the regulator comprises a small main diaphragm 73 which controls the opening of a servo valve 67, the delivery of oxygen from this valve creating a pressure on a secondary diaphragm 69 which controls the opening of a demand valve 61. In this way very large flows are possible despite the smallness of the main diaphragm 73 and the very low controlling pressures. Also associated with the rise in pressure downstream of the servo valve 67 is an indicating mechanism. This mechanism comprises a differential diaphragm 85 assembly which actuates a micro-switch 88 when the pressure across the diaphragm 85 rises above a predetermined figure which corresponds to a chosen flow rate.

The flow from the servo valve 67 is directed through an injector nozzle 71 and a venturi formed by the mixing tube 65 to induce a flow of air during normal operation and in this way very good airmix performance is possible even at low oxygen flows. In addition to the venturi action of nozzle 71 and mixing tube 65 a second venturi action is created by the effect of mixing tube 65 and pipe 21 which are in communication with the main chamber 72. In this way the regulator can deliver oxygen, or air and oxygen, at a positive pressure which increases with flow. The advantage of this is that at high flow when there would normally be a large pressure drop through the pipes 21 and 19 between the regulator 20 and the mask 17, some of this pressure drop is offset by the rise in regulator delivery pressure.

Airmix is controlled either automatically or manually. The automatic control comprises an airmix aneroid 120 that expands with increase of altitude and slowly obstructs the entry of air to opening 121, while the manual control utilizes a solenoid controlled bleed valve which closes a valve 117 and totally prevents the entry of air if 100% oxygen is to be delivered.

Safety pressure operation depends on the application of a slight biasing spring load from spring 95 to the main diaphragm 73 above a given altitude. This is again achieved by an aneroid 110 assembly that expands with increase of altitude and eventually opens a bleed valve 109. This principle of operation is chosen to give a rapid onset of safety pressure to avoid poor cyclic breathing characteristics over a wide altitude range. This method of operation also facilitates the remote control of safety pressure which is linked with the control of 100% oxygen; the single action of opening the solenoid controlled bleed valve causes the air valve 117 to close and the safety pressure spring to operate.

Above 40,000 ft., pressure breathing is delivered in accordance with the needs of the protective clothing being worn. This control is achieved pneumatically by an aneroid bellows 92 which expands and maintains the pressure in the control chamber 90 to the correct figure.

As can be seen from the foregoing description, the system is adapted to perform in several varying roles which may be automatic or effected manually according to the conditions prevailing and for clarity it is convenient to deal with each role as a separate entity under the following headings:

(1) Testing before take-off.
(2) Normal operation 0 to 15,000 ft. altitude.
(3) Normal operation 15,000 ft. to 34,000 ft. altitude.
(4) Normal operation above 34,000 ft. to 40,000 ft. altitude.
(5) Normal operation above 40,000 ft. altitude.
(6) Contaminated atmosphere in cabin when flying at 10,000 ft.
(7) Suspected failure of main regulator.
(8) Failure of aircraft electrical supply.
(9) Failure of aircraft oxygen supply.
(10) Ejection from aircraft.

(1) TESTING BEFORE TAKE-OFF

*Checking the normal working of the main demand regulator and the flow indicator*

Assuming that oxygen gas has just been turned on, oxygen from the aircraft supply pipe 22 passes through the pull-away coupling 23, pipe 35, non-return valve 38, by-pass valve 29, pipe 39 to main demand regulator 20 where it acts underneath the demand valve 21, and also passes to the reducing valve 66 simultaneously flowing into pipe 104. Assuming the aircraft electrical supply is available and the airmix over-ride switch 34 allows current to flow in electric cable 54, the solenoid will be energized and the bleed valve 111 will be closed thus allowing pressure to build up in pipes 106 and 114 due to oxygen passing through the first restriction 105 from pipe 104. This pressure will extend pressure bellows 115 and lift beam 116 against the associated spring thus opening the air valve 117. Pressure will also build up in pipe 108 and chamber 103 due to oxygen passing the second restriction 107; this pressure will compress the bellows 100 and move the rod 101 to the right thus tilting the lever 97 and thereby moving the cup member 94 against the force exerted by safety pressure spring 95. Oxygen is delivered at a reduced pressure to the servo valve 67 from the reducing valve 66. When the pilot 10 inhales, the pressure in pipe 21 and the main chamber 72 is reduced and the main diaphragm 73 is deflected to the right. This deflection opens to servo valve 67 by way of lever 75 and stem 74. The operation of opening valve 67 allows pressure to build up in servo chamber 68 which deflects the secondary diaphragm 69 to the left thereby rotating the demand valve lever 80 to move the valve stem 62 and open the demand valve 61 so that inlet oxygen enters the second chamber 62 and passes into the mixing tube 65 via the outlet bore 64. The pressure that has built up in servo chamber 68 causes oxygen to flow in passage 70 and to pass at high velocity through the nozzle 71 into mixing tube 65 thus inducing cabin air through tube 118, check valve 119 and the opening 121. The angle at which the outlet bore 64 meets the mixing tube 65 assists the flow and a "boost" effect is obtained by the flow from the mixing tube 65 causing a slight depression in the feed back conduit 83. When the demand for breathable gas has been satisfied, the pressure in pipe 21 will rise slightly and the main diaphragm 73 will be moved to the left thereby closing the servo valve 67. The pressure in servo chamber 68 will fall due to gas flow out of nozzle 71 and the secondary diaphragm 69 will then move to the right allowing demand valve 61 to close.

During this sequence, when the pressure in servo chamber 68 increased, the differential diaphragm 85 was deflected to the left thereby causing push rod 89 to actuate the microswitch 84 which in turn actuated the flow indicator 33 on the instrument panel 16.

At this stage the pilot 10 has checked that the main demand regulator 20 is functioning correctly and will supply breathable gas on demand and the pilot has also checked the operation of the flow indicator 33.

Checking the mask for leakage

The pilot 10 presses a button provided on the pressure test button unit 31 and oxygen flows along pipe 44 passing through the restriction orifice 45 through unit 31 which reduces the pressure thereby allowing a pressure of say 0.5 p.s.i. to be available in pipe 46 to move diaphragm 123 against the force in the associated spring thus causing valve plate 122 to close pipe 48. The small orifice in the valve plate 122 allows pressure to build up to 0.5 p.s.i. in chamber 90 which will cause the main demand regulator 20 to deliver oxygen until the pressure in pipes 21, 19 and mask 17 is built up to 0.5 p.s.i. By this procedure the pilot is able to conveniently test the mask 17 for leakage.

Testing the secondary demand regulator 28

The operation of the secondary demand regulator 28 may be checked by the pilot 10 operating a lever 51 on the by-pass control 30. By this operation oxygen gas pressure is supplied by way of pipe 41 from pipe 35 to by-pass control 30 and from by-pass control 30 to by-pass valve 29, by way of pipe 43, this pressure operates the by-pass 29 thus shutting off the supply of oxygen to the main demand regulator 20 and opening the supply to the secondary demand regulator 28. The lever 51 is then manually moved back to its original position thus applying pressure to pipe 42. By-pass valve 29 then restores the oxygen supply to the main demand regulator 20.

Checking the store of emergency oxygen

The emergency oxygen stored in the oxygen cylinder 24 is checked by the pilot 10 reading the pressure gauge 26 upon entering the aircraft.

(2) NORMAL OPERATION 0 TO 15,000 FT. ALTITUDE

Within this altitude range the system operates as described in the first part of the testing before take-off procedure, but with the additional feature that the ratio of airmix is controlled automatically by expansion of the airmix aneroid 120 sensing cabin altitude.

(3) NORMAL OPERATION 15,000 FT. TO 34,000 FT. ALTITUDE

At 15,000 ft. the safety pressure control aneroid 110 will have expanded a sufficient amount to open the safety pressure bleed valve 109 thus releasing the pressure in pipe 108 and chamber 103. As hereinbefore described this will cause the cup member 94 to rest upon the main diaphragm 73.

The effect of the cup member 94 transmitting the force of safety pressure spring 95 to the main diaphragm 73 is that a safety pressure of say 1″ of water will be added to and maintained in the system. The rapid onset of safety pressure avoids poor cyclic breathing characteristics over a wide altitude range.

As altitude increases the airmix aneroid 120 will continue to reduce the opening 121 until at say 34,000 ft. the opening 121 will be closed.

(4) NORMAL OPERATION 34,000 FT. TO 40,000 FT.

Within this range 100% oxygen is supplied at the safety pressure.

(5) NORMAL OPERATION ABOVE 40,000 FT. ALTITUDE

At 40,000 ft. the aneroid bellows 92 will have expanded sufficiently to close aperture 91. Oxygen from main chamber 72 passing through the small hole 93 into control chamber 90 builds up pressure until the aneroid bellows 92 are compressed sufficiently to allow an equal quantity of oxygen to pass out of control chamber 90.

Thus the pressure in the control chamber is maintained at a constant pressure of 40,000 ft. altitude for any further increase in altitude of the cabin.

(6) CONTAMINATED ATMOSPHERE IN THE CABIN WHEN FLYING AT 10,000 FT.

If the pilot finds that the air he is breathing through the airmix injector is contaminated for example by smoke, he operates the airmix over-ride switch 34 on the instrument panel 16 and this breaks the circuit energizing the solenoid 113. When the solenoid is de-energized the spring loaded bell crank 112 opens the bleed valve 111 and the pressure in pipes 106 and 114 falls causing the bellows 115 to contract thereby closing air valve 117. As the pressure falls in pipe 106 it also falls in pipe 108 and chamber 103 causing the safety pressure to be applied by the spring 95. The pilot is therefore supplied with 100% oxygen at the safety pressure which prevents contaminated air leaking past the mask seal.

(7) SUSPECTED FAILURE OF MAIN DEMAND REGULATOR

If the pilot suspects that the main demand regulator 20 is not functioning correctly he operates the lever 51 of the by-pass control 30. This causes the secondary demand regulator 28 to be brought into use as hereinbefore described in the testing before take-off procedure.

(8) FAILURE OF AIRCRAFT ELECTRICAL SUPPLY

If the aircraft electrical supply fails the pilot will be supplied with 100% oxygen at the safety pressure as in the case 6.

(9) FAILURE OF AIRCRAFT OXYGEN SUPPLY

If the oxygen supply from the aircraft fails the pilot may suspect the main demand regulator 20. In this event he will carry out the procedure as hereinbefore described in case 7. If the pilot finds that there is no response, he pulls the knob 32 which is attached to flexible cable 50 and operates the gas release mechanism 25. As a result gas from oxygen cylinder 24 will flow through pipe 36 to provide an emergency oxygen supply.

If the pilot knows that the aircraft oxygen supply has definitely failed, he will not carry out the procedure as in case 7 but will pull knob 32 which in this instance will automatically operate the by-pass control lever 51 by way of the flexible cable 52 as well as releasing the emergency oxygen supply by way of flexible cable 50, in a manner such that the pilot is provided with an emergency supply of oxygen and a change over to the secondary demand regulator 28 due to the one action of pulling knob 32.

(10) EJECTION FROM AIRCRAFT

The act of ejecting the seat 11 from the aircraft, automatically initiates the delivery of the emergency oxygen supply from the oxygen cylinder 24 by the action of an aircraft mounted striker (not shown) which contacts the arm of the gas release mechanism 25 as the seat 11 moves relative to the aircraft.

The oxygen from the bottle 24 is delivered to the regulator in use at the moment of ejection and it will be appreciated that this may be the main demand regulator 20 or the secondary demand regulator 28. It will be further appreciated that the pilot is not required to take any action to provide himself with oxygen upon ejection, the whole operation being automatic.

Although this invention has disclosed a system specifically meeting the requirements of a seat-mounted system it will be appreciated that the main demand regulator may be equally well applied to other installations. For example, the fact that the main demand regulator may be operated by total remote control enables it to be installed in positions which may not be easily accessible to the user although convenient to the rest of the cabin layout. The controls for the main demand regulator 20, namely the airmix override switch 34 and the pressure test button unit 31 may be located in the cabin at a position that is visible and accessible without occupying valuable space on the instrument panel 16.

We claim as our invention:

1. A servo operated oxygen demand regulator comprising a casing having an oxygen supply inlet, a demand outlet and an ambient air inlet, a demand valve situated between said supply inlet and said demand outlet to control oxygen flow therebetween, a main diaphragm disposed within said casing and subjected on one side thereof to demand outlet pressure in a main chamber and on the other side to pressure at or above cabin pressure, lever means for operatively connecting said main diaphragm to a servo valve, said servo valve being subjected on one face thereof to a substantially constant pressure from a pressure reducing valve disposed between said supply inlet and said servo valve, a servo chamber formed within said casing having a portion of one wall formed by a secondary diaphragm operatively connected to said demand valve, said servo chamber being disposed within said casing in a position such that oxygen from said servo valve passes into said servo chamber for building up pressure therein to cause said secondary diaphragm to deflect and open said demand valve, said pressure reducing valve being arranged to deliver oxygen to said servo valve at a substantially constant pressure below a predetermined pressure range of said inlet supply, an air mix injector comprising a nozzle and a mixing tube, said nozzle being in communication with said servo valve and arranged to inject oxygen into said mixing tube from said servo valve in a manner as to induce ambient air into said mixing tube from said ambient air inlet, the mixture of oxygen and air further mixing with the oxygen from said demand valve to pass out of said demand outlet.

2. A servo operated oxygen demand regulator comprising a casing having an oxygen supply inlet, a demand outlet and an ambient air inlet, a demand valve situated between said supply inlet and said demand outlet to control oxygen flow therebetween, a main diaphragm disposed within said casing and subjected on one side thereof to demand outlet pressure in a main chamber and on the other side to pressure at or above cabin pressure, lever means for operatively connecting said main diaphragm to a servo valve, said servo valve being subjected on one face thereof to a substantially constant pressure from a pressure reducing valve disposed between said supply inlet and said servo valve, a servo chamber formed within said casing having a portion of one wall formed by a secondary diaphragm operatively connected to said demand valve, said servo chamber being disposed within said casing in a position such that oxygen from said servo valve passes into said servo chamber to build up pressure therein for causing said secondary diaphragm to deflect and open said demand valve, said pressure reducing valve being arranged to deliver oxygen to said servo valve at a substantially constant pressure below a predetermined pressure range of said inlet supply, an air mix injector comprising a nozzle and a mixing tube, said nozzle being in communication with said servo valve and arranged to inject oxygen into said mixing tube from said servo valve in a manner as to induce ambient air into said mixing tube from said ambient air inlet, said mixing tube being provided with a passageway in the wall thereof communicating with said demand valve, said passageway joining said tube at an acute angle so that oxygen from said demand valve assists fluid flow in said tube.

3. A servo operated oxygen demand regulator comprising a casing having an oxygen supply inlet and a demand outlet, a demand valve disposed therebetween and adapted to control oxygen flow between said inlet and said outlet, a main diaphragm disposed within said casing and subjected on one side thereof to demand outlet pressure in a main chamber and on the other side to pressure at or above cabin pressure, lever means for operatively connecting said main diaphragm to a servo valve, said servo valve being subjected on one face thereof to a substantially constant pressure from a pressure reducing valve disposed between said supply inlet and said servo valve, a servo chamber formed within said casing and having a portion of one wall formed by a secondary diaphragm operatively connected to said demand valve, said servo chamber being disposed within said casing, in a position such that oxygen from said servo valve passes into said servo chamber and oxygen from said servo chamber passes through a restriction into said demand outlet, a remote indicator circuit including a pressure actuated switch being in communication with said servo chamber, the arrangement being such that buildup of pressure in said servo chamber causes said secondary diaphragm to deflect and open said demand valve, said pressure buildup also actuating said switch.

4. A servo operated oxygen demand regulator comprising a casing having an oxygen supply inlet, a demand outlet and an ambient air inlet, a demand valve situated between said supply inlet and said demand outlet to control oxygen flow therebetween, a main diaphragm disposed within said casing and subjected on one side thereof to demand outlet pressure in a main chamber and on the other side to pressure at or above cabin pressure, lever means for operatively connecting said main diaphragm to a servo valve, said servo valve being subjected on one face thereof to a substantially constant pressure from a pressure reducing valve disposed between said supply inlet and said servo valve, a servo chamber formed within said casing having a portion of one wall formed by a secondary diaphragm operatively connected to said demand valve, said servo chamber being disposed within said casing in a position such that oxygen from said servo valve passes into said servo chamber to build up pressure therein for causing said secondary diaphragm to deflect and open said demand valve, said pressure reducing valve being arranged to deliver oxygen to said servo valve at a substantially constant pressure below a predetermined pressure range of said inlet supply, an air mix injector comprising a nozzle and a mixing tube, said nozzle being in communication with said servo valve and arranged to inject oxygen into said mixing tube from said servo valve in a manner so as to induce ambient air into said mixing tube from said ambient air inlet, said mixing tube being provided with a passageway in the wall thereof communicating with said demand valve, said passageway joining said tube at an acute angle such that oxygen from said demand valve assists fluid flow in said tube, a pressure actuated switch of a remote indicator circuit being in communication with said servo chamber being operated by pressure buildup therein.

5. A servo operated oxygen demand regulator comprising a casing having an oxygen supply inlet and a demand outlet, a demand valve disposed therebetween and adapted to control oxygen flow between said inlet and said outlet, a main diaphragm disposed within said casing being subjected on one side thereof to demand outlet pressure in a main chamber and on the other side to pressure at or above cabin pressure, means comprising a lever for operatively connecting said main diaphragm to a servo valve, said servo valve being subjected on one face thereof to a substantially constant pressure from a pressure reducing valve disposed between said supply inlet and said servo valve, a servo chamber formed with said casing having a portion of one wall formed by a secondary diaphragm operatively connected to said demand valve, said servo chamber being disposed within said casing in a position such that oxygen from said servo valve passes into said servo chamber for building up pressure therein for causing said secondary diaphragm to deflect and open said demand valve, said pressure reducing valve being arranged to deliver oxygen to said servo valve at a substantially constant pressure below a predetermined pressure range of said inlet supply, a chamber formed between said casing and the side of said main diaphragm remote from said main chamber housing therein a compression spring adapted to apply a force to said main diaphragm thereby creating a safety pressure at said demand outlet, said spring being maintained out of contact with said main diaphragm in the inoperative condition by way of a lever actuated by means responsive to pressure, said pressure responsive means sensing pressure from high pressure oxygen from said supply inlet by way of a conduit containing a restriction and a bleed valve downstream of said restriction, said bleed valve being controlled automatically by an altitude sensitive aneroid such that when a predetermined altitude is reached the bleed valve is opened and the high pressure oxygen holding the spring out of contact with the main diaphragm is released so that the safety pressure is rapidly applied.

6. A servo operaed oxygen demand regulator comprising a casing having an oxygen supply inlet and a demand outlet, a demand valve disposed therebetween and adapted to control oxygen flow between said inlet and said outlet, a main diaphragm disposed within said casing and subjected on one side thereof to demand outlet pressure in a main chamber and on the other side to pressure at or above cabin pressure, lever means for operatively connecting said main diaphragm to a servo valve, said servo valve being subjected on one face thereof to a substantially constant pressure from a pressure reducing valve disposed between said supply inlet and said servo valve, a servo chamber formed within said casing having a portion of one wall formed by a secondary diaphragm operatively connected to said demand valve, said servo chamber being disposed within said casing in a position such that oxygen from said servo valve passes into said servo chamber to build up pressure therein for causing said secondary diaphragm to deflect and open said demand valve, said pressure reducing valve being arranged to deliver oxygen to said servo valve at a substantially constant pressure below a predetermined pressure range of said inlet supply, a chamber formed between said casing and the side of said main diaphragm remote from said main chamber housing therein, a compression spring adapted to apply a force to said main diaphragm thereby creating a safety pressure at said demand outlet, said spring being maintained out of contact with said main diaphragm in the inoperative condition by way of a lever actuated by means responsive to pressure, said pressure responsive means sensing pressure from high pressure oxygen from said supply inlet by way of a conduit containing a restriction and a bleed valve downstream of said restriction, said bleed valve being controlled by a solenoid, said solenoid when energized holding said bleed valve closed against the action of a spring tending to open said bleed valve, said solenoid being normally energized, switch means in circuit with said solenoid to de-energize it due to opening of the switch or failure of the electrical supply, said bleed valve being opened in response to said solenoid being de-energized, high pressure oxygen holding the spring out of contact with the release of said main diaphragm so that the safety pressure is rapidly applied.

References Cited by the Examiner
UNITED STATES PATENTS

| 2,302,707 | 11/42 | Mejean | 244—122.5 |
| 2,813,690 | 11/57 | Holmes | 244—122 |
| 2,834,343 | 5/58 | Keckler et al. | 128—144 |
| 2,897,833 | 8/59 | Seeler | 137—64 |
| 2,918,073 | 12/59 | Goodner | 137—64 |
| 2,929,377 | 3/60 | Cummins | 128—44 |
| 2,977,078 | 3/61 | Fitt | 244—122 |

FOREIGN PATENTS 785,371 10/57 Great Britain.

FERGUS S. MIDDLETON, *Primary Examiner.*
MILTON BUCHLER, *Examiner.*